(12) United States Patent
Rossano et al.

(10) Patent No.: US 10,282,077 B2
(45) Date of Patent: May 7, 2019

(54) COMMERCIAL AVIATION DEICING SYSTEM

(71) Applicant: Exelis Inc., Herndon, VA (US)

(72) Inventors: Christopher F. Rossano, Herndon, VA (US); Lado Tonia, Herndon, VA (US); Joel Kimble, Herndon, VA (US)

(73) Assignee: Harris Corporation, Melbourne, FL (US)

( * ) Notice: Subject to any disclaimer, the term of this patent is extended or adjusted under 35 U.S.C. 154(b) by 731 days.

(21) Appl. No.: 14/851,690

(22) Filed: Sep. 11, 2015

(65) Prior Publication Data

US 2016/0075436 A1 Mar. 17, 2016

Related U.S. Application Data

(60) Provisional application No. 62/049,045, filed on Sep. 11, 2014.

(51) Int. Cl.
*G06F 3/0487* (2013.01)
*B64F 5/20* (2017.01)
*G06F 3/0484* (2013.01)

(52) U.S. Cl.
CPC ............ *G06F 3/04847* (2013.01); *B64F 5/20* (2017.01)

(58) Field of Classification Search
CPC ....... B64F 5/20; G05B 23/0272; G06Q 10/20; G08G 5/0043
See application file for complete search history.

(56) References Cited

U.S. PATENT DOCUMENTS

| | | | | |
|---|---|---|---|---|
| 5,180,122 A | * | 1/1993 | Christian | B64F 5/20 244/134 C |
| 2003/0069648 A1 | * | 4/2003 | Douglas | G06Q 10/20 700/2 |
| 2005/0090969 A1 | * | 4/2005 | Siok | G08G 5/0013 701/120 |
| 2007/0040064 A1 | * | 2/2007 | Lee | B64F 5/20 244/134 R |
| 2013/0073419 A1 | * | 3/2013 | Marwedel | G06Q 10/06 705/26.5 |
| 2015/0081141 A1 | * | 3/2015 | Campbell | B64F 5/0054 701/3 |

* cited by examiner

*Primary Examiner* — Andrew L Tank
(74) *Attorney, Agent, or Firm* — Edell, Shapiro & Finnan, LLC

(57) ABSTRACT

An apparatus for monitoring and controlling operations for deicing aircraft at an airport facility includes a display device configured to display a visual data presentation of deicing operations data. The visual data presentation including at least one map depicting: a visual representation of at least one aircraft participating in a deicing process, wherein the visual representation of the aircraft includes attributes identifying the aircraft and indicating a stage of the deicing process the aircraft is undergoing; and a visual representation of a deicing facility with a plurality of deicing bays for deicing aircraft, wherein the visual representation of the deicing facility presents each of the deicing bays as a distinct geofenced area with display attributes indicating an operating status of each of the deicing bays.

17 Claims, 12 Drawing Sheets

| Fluid Display | | | | | | |
|---|---|---|---|---|---|---|
| Bay | Boom | Type 1 Level (Gal) | Water Level (Gal) | Mix % | Type 4 Level (Gal) | Spray Active |
| 2 | A | 1.0 | 10.5 | 2.0 | 15.2 | ☐ |
| 2 | B | 1.0 | 10.5 | 2.0 | 15.2 | ☐ |
| 3 | A | ⋮ | ⋮ | ⋮ | ⋮ | ⋮ |
| 3 | B | ⋮ | ⋮ | ⋮ | ⋮ | ⋮ |
| 4 | A | 1.0 | 10.5 | 2.0 | 15.2 | ☐ |
| 4 | B | 1.0 | 10.5 | 2.0 | 15.2 | ☐ |
| 5 | A | 1.0 | 10.5 | 2.0 | 15.2 | ☒ |
| 5 | B | 1.0 | 10.5 | 2.0 | 15.2 | ☐ |
| 6 | A | 1.0 | 10.5 | 2.0 | 15.2 | ☐ |
| 6 | B | 1.0 | 10.5 | 2.0 | 15.2 | ☐ |
| 7 | A | 1.0 | 10.5 | 2.0 | 15.2 | ☐ |
| 7 | B | 1.0 | 10.5 | 2.0 | 15.2 | ☒ |

FIG. 5

Deicing Event

| Tail Number: | JBU1986 | | Type 1%: | 3.0 | Mixture Type: | Type 1 |
|---|---|---|---|---|---|---|
| AC Type: | A320... | | Type 1 Amount: | 3.05 | Type 4 Amount: | 3.0 |
| Airline: | JBU... | | Type 1 LOUT: | 120.0 F | Type 4 LOUT: | 120.0 F |
| De-Icing Bay: | Bay 1... | | Type 1 Start: | / / | Type 4 Start: | / / |
| | | | Type 1 Stop: | / / | Type 4 Stop: | / / |

In Queue: / /
On Deck: / /
On Block: / /
Start De-Ice: / /
Stop De-Ice: / /
Safe Time: / /
Off Block: / /

Secondary Conditions: 6 in Ice Overnight
General Comments:
Comments...

☐ Has Surveillance Data   ☐ User Defined

[ Create ]   [ Cancel ]

FIG. 9

| Type | Mixture Percent | LOUT |
|---|---|---|
| 4 | -- | 15 |
| 1 | 20 | 52 |
| 1 | 40 | 40 |
| 1 | 60 | 32 |
| 1 | 80 | 25 |

LOUT Management

FIG.12

COMMERCIAL AVIATION DEICING SYSTEM

CROSS REFERENCE TO RELATED APPLICATION

This application claims priority under 35 U.S.C. § 119(e) to U.S. Provisional Application No. 62/049,045, filed Sep. 11, 2014, the entire contents of which are hereby incorporated herein by reference.

BACKGROUND

In cold, inclement weather, frozen precipitation can collect on an aircraft and affect its ability to fly. Ice accretion on an aircraft may cause the shape of airfoils and flight control surfaces to change, which can lead to a catastrophic loss of control or insufficient lift to keep the aircraft airborne. Deicing systems are designed to keep atmospheric ice from accumulating on aircraft flight surfaces, and the process of deicing an aircraft becomes a critical part of an aircraft's departure procedure in such weather conditions.

In a conventional approach to aircraft deicing, typically the aircraft's pilot makes a request to have the aircraft deiced prior to departure. This request triggers the collection of key information about the aircraft and various notifications regarding the aircraft's intent. The aircraft then progresses to a deicing facility, where it is assigned to a deicing location, or bay, based on the aircraft's size. At the deicing bay, the appropriate amount and type of deicing fluid is applied based on weather conditions, pre-existing frozen water on the airframe, airframe manufacture specifications, and aircraft owner's procedures. With accurate advanced notice of which aircraft are to arrive and in what order, the appropriate coordination can take place by the air traffic ground control and the deicing facility to allow for minimal additional delays in deicing the aircraft prior to the flight's departure.

Such conventional approaches for handling deicing operations work well in most cases, but break down under the light and heavy extremes of activity. Specifically, in these cases, aircraft have a tendency to arrive in the deicing facility in the wrong order, with the wrong information, or without any notice. As a result, deicing bays of the proper size may not be available. This situation requires repositioning aircraft in the deicing queue which, since aircraft only move forward, can result in aircraft needing to progress through the deicing facility and back into the deicing queue. Similarly, aircraft may have to be held or repositioned if bay crews are not in position. Both issues result in extra coordination between the pilots, ground control, and the deicing facility staff and lead to both increased delays of flights and airport operations as a whole. While some automation has been leveraged to improve the traditional workflow, gaps still remain in providing accurate overall situational awareness and insight into the process.

SUMMARY

An apparatus for monitoring and controlling operations for deicing aircraft at an airport facility includes: a user interface configured to receive user-entered data relating to deicing operations and display control settings; a network interface configured to supply the user-entered data to at least one server via a network and to receive deicing operations data from the at least one server via the network; a processor configured to process the deicing operations data received from the at least one data server in accordance with the display control settings; and a display device configured to display a visual data presentation of at least some of the deicing operations data. The visual data presentation including at least one map depicting: a visual representation of at least one aircraft participating in a deicing process, wherein the visual representation of the aircraft includes attributes identifying the aircraft and indicating a stage of the deicing process the aircraft is undergoing; and a visual representation of a deicing facility with a plurality of deicing bays for deicing aircraft, wherein the visual representation of the deicing facility presents each of the deicing bays as a distinct geofenced area with display attributes indicating an operating status of each of the deicing bays.

The above and still further features and advantages of the described system will become apparent upon consideration of the following definitions, descriptions and descriptive figures of specific embodiments thereof wherein like reference numerals in the various figures are utilized to designate like components. While these descriptions go into specific details, it should be understood that variations may and do exist and would be apparent to those skilled in the art based on the descriptions herein.

BRIEF DESCRIPTION OF THE DRAWINGS

FIG. 5 is a mockup of a deicing fluid data display window that can be displayed on a graphical user interface of a client device.

FIG. 9 is a mockup of a deicing data entry window that can be displayed on a graphical user interface of a client device.

FIG. 12 is a mockup of a LOUT management table that can be displayed on a graphical user interface of a client device.

DETAILED DESCRIPTION

Described herein is a commercial aviation deicing system to collect, store, and monitor aircraft deicing operations at an airport facility, which addresses the aforementioned shortcomings of conventional approaches by uniquely leveraging multi-source aircraft surveillance and delivering information through an easily distributable web-hosted solution to key stakeholders in an automated system. Through the leveraging of aircraft surface surveillance into the processes, real-time visibility of actual aircraft locations at an airport facility, correlated with the deicing state data, provides airline, air traffic control, and deicing facility stakeholders a precise understanding of the location, characteristics, and state of aircraft well beyond simple automation. Inclusion of live aircraft positional data in the display and processing allows the stakeholders to be alerted immediately to certain conditions, manage the overall workflow better, and correctly prepare for aircraft arrival at a facility. This in turn has the effect of increasing overall throughput of the deicing facility and reducing delays for any given flight and the airport in general. It also contributes to a reduction in flight cancelations due to reduced airport capacity and improved overall safety by providing accurate and timely "virtual" visibility at night and during severe weather.

The deicing system provides a user interface to enable user entry of aircraft deicing data and to generate the necessary reporting information. The system correlates information and presents report data relating to aircraft position and flight data, deicing equipment and facilities (e.g., deicing fluid level, on/off "block" times for aircraft in the deicing facility), weather, and staff records. The system further provides information about deicing "bays" within the deicing facility as part of a graphical user interface (GUI), including data blocks, smart tables, and highlighting. The ability to "click" on a graphical representation of an aircraft to open aircraft deicing dialog and set the start and stop time for deicing is provided via the interface, as well as managing deicing staffing information, e.g., assigning staff to specific deicing booms. Optionally, a touch screen interface can be employed. The system provides a web-based tool that is accessible through a public facing URL for users that are authorized. According to one implementation, at-gate deicing and gate management can be incorporated into the system.

Figure 1:
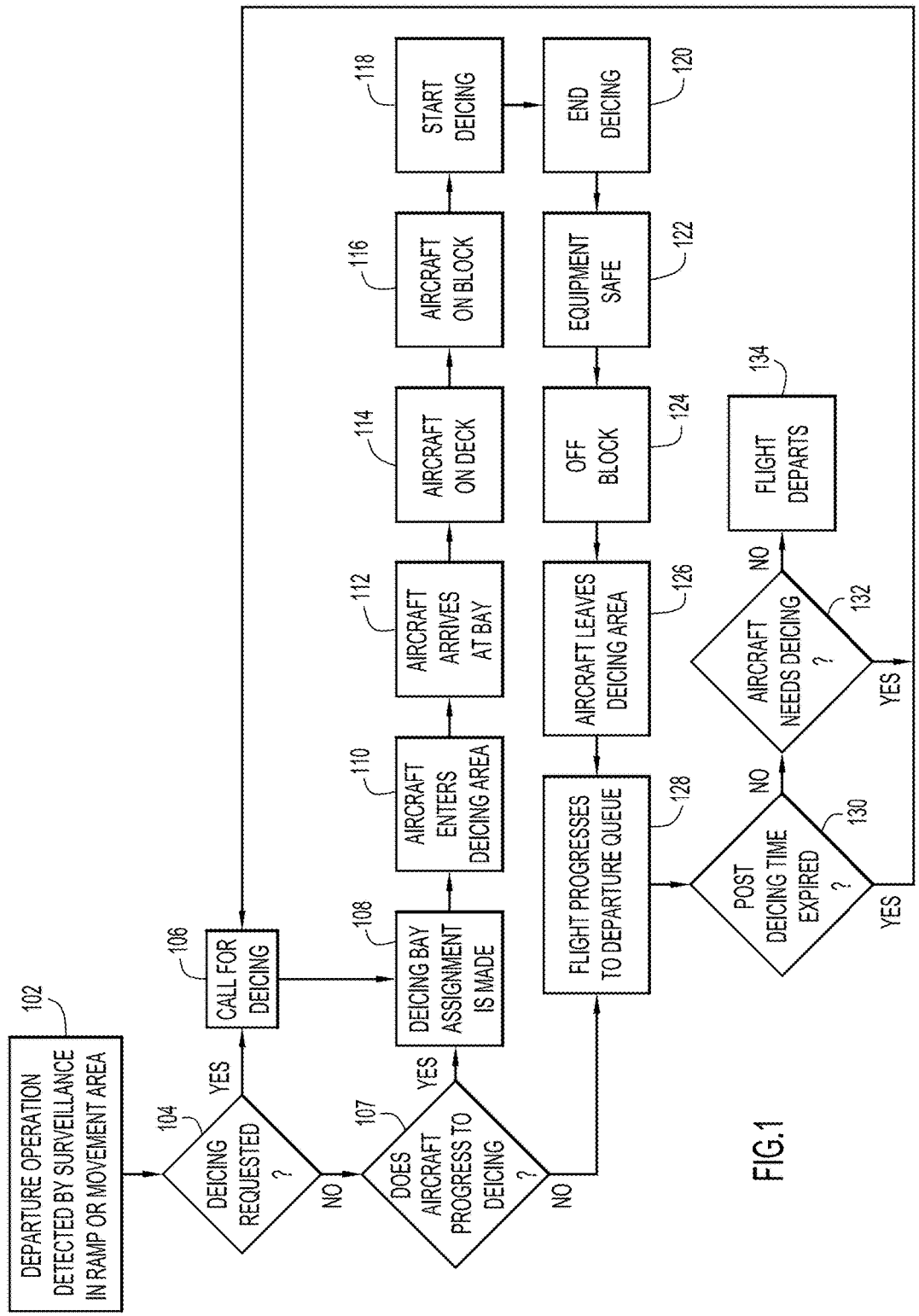
FIG. 1 is a functional flow diagram illustrating the overall process of deicing an aircraft in relation to the flight departure operation.

FIG. 1 is a flow diagram illustrating the workflow for managing an aircraft deicing operation at an airport according to an example implementation of the deicing system. In operation 102, a departure sequence begins when an aircraft departure operation is detected by surveillance in the ramp or movement area. The aircraft identification available from surveillance includes, for example, the flight ID, the aircraft tail number, the aircraft type, and the airline. After the departure operation is detected in operation 102, if deicing has been requested (decision block 104), a call for deicing is made (operation 106) and the aircraft is routed to the deicing facility to begin the deicing process at operation 108. Even if a deicing request has not been made in decision block 104, a determination may nevertheless be made (decision block 107) to cause the aircraft to undergo the deicing process, beginning with operation 108. Otherwise, the aircraft continues the departure sequence by progressing to the departure queue (operation 128).

In operation 108, a deicing bay within the deicing facility is assigned to the aircraft. Since bays of different sizes may be available, the assignment of a particular deicing bay may be based at least in part on the size of the aircraft to ensure that the aircraft fits within the bay. As the aircraft proceeds to the deicing facility, it traverses a series of monitored locations. The aircraft first enters the deicing area (operation 110) and arrives at the assigned bay within the deicing facility (operation 112). Next, the aircraft proceeds to an "on deck" location (operation 114) and then to an "on block" location (operation 116) where the deicing procedure is performed.

The deicing procedure starts (operation 118) as the deicing fluid begins to flow and is applied to the surface of the aircraft. Deicing typically involves the removal of snow, ice or frost from the outer surface of an aircraft. This process may include the application of "Type 1" liquid chemicals designed to lower the freezing point of water (various salts or brines, alcohols, glycols, etc.). The deicing procedure may also include the application of "Type 4" liquid chemicals that not only deice but also remain on the surface of the aircraft and continue to delay the reformation of ice for a certain period of time (anti-icing), or prevent adhesion of ice to make mechanical removal easier. Type 1 fluids have a relatively low viscosity and are typically sprayed on hot and at high pressure to remove snow, ice, and frost. Type 4 fluids generally contain a polymeric thickening agent to prevent their immediate flow off of aircraft surfaces. The residual film remains in place until the aircraft attains a certain velocity. For both Type 1 and Type 4 deicing fluids, the lowest operational use temperature (LOUT) is defined as the higher of the lowest temperature at which the fluid meets the aerodynamic acceptance test for a given aircraft type and the actual freezing point of the fluid plus its freezing point buffer (10° C. for a Type 1 fluid and 7° C. for a Type 4 fluid). Each bay in the deicing facility includes one or more booms from which the deicing fluid is sprayed onto the aircraft surface by a boom operator.

Deicing of the aircraft ends (operation 120) as the deicing fluid flow stops. In operation 122, the deicing equipment (e.g., booms) are returned to a safe position, and the aircraft is moved "off block" (operation 124) and leaves the deicing area (operation 126) to conclude the deicing process. The deicing process is accompanied by data entry associated with certain events. For example, the state of the deicing bay and which aircraft is present in the bay may be entered via a user interface device along with secondary conditions and comments relating to the aircraft or the deicing procedure. Further, data relating to the deicing fluid may be checked or modified.

Once the deicing process has been completed, the aircraft resumes the departure sequence as it progresses to the departure queue in operation 128. While awaiting departure, if the post-deicing time expires (decision block 130) or the aircraft otherwise needs deicing (decision block 132), the aircraft returns to the deicing process and flow returns to operation 106 (call for deicing) in the flow diagram of FIG. 1. Otherwise, the flight departs (operation 134).

Figure 2:
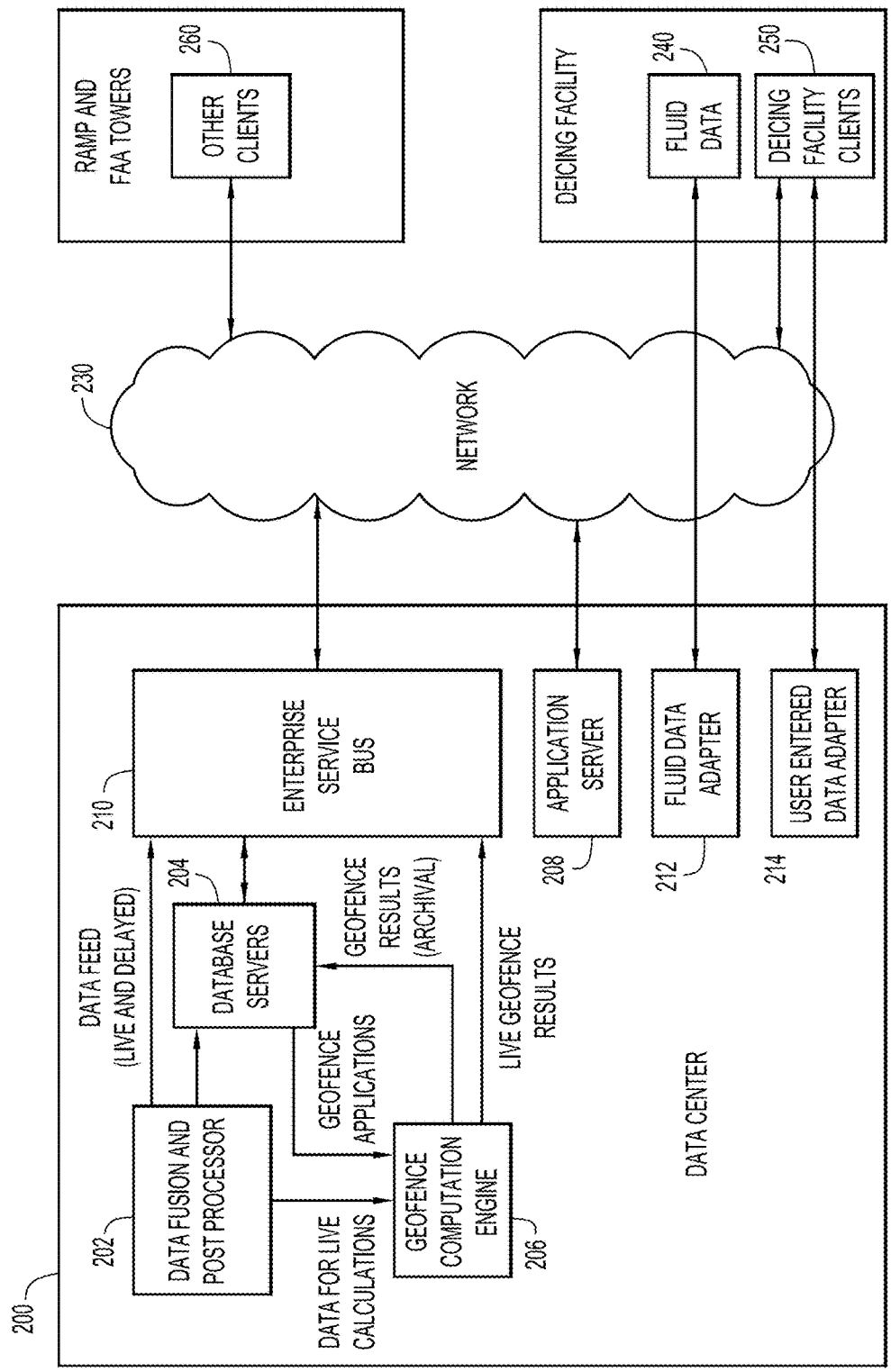
FIG. 2 is a block diagram of a commercial aviation deicing system, including a server-based data center and client devices providing user interfaces at various locations.

FIG. 2 is a block diagram illustrating an overview of the system architecture of an example implementation of a commercial aviation deicing system capable of carrying out the deicing process shown in FIG. 1. A server-based data center 200 includes a data fusion and post processor 202 that receives a NextGen commercial data feed driven by FAA and commercial surveillance sources, including aircraft positional data. One or more database servers 204 provide database support services and are used for real time, near real time, and historic data retrieval. Database servers 204 receive aircraft position data from data fusion post processor 202. The deicing system captures a variety of information relating to the deicing process from client devices and stores this information in database servers 204. For example, the system captures the following information and associated timestamps: deicing state changes, user-entered requests for deicing associated with a flight; user-entered bay assignment information associated with a flight, the user-enterable text strings associated with a flight. The deicing system is capable of automating the deicing start time through the capture of the start spray event (stop time is manual as multiple spray events may occur per deicing event). The database servers 204 further store: all staff names, certifications, and roles, all fields required for reports, all geofence statistics and geofencing corresponding parameters, all deicing pads statistics, all deicing pads corresponding parameters, including width, manually entered aircraft type wing spans which are matched to ACAO aircraft type codes, deicing bay assignments, all deicing data such that it can be replayed (only final state and state times need be stored; not all edits and updates), and data for the deicing client in a separate table space from other clients' data.

A geofencing computation engine 206 performs real time calculations for the detection of aircraft latitude, longitude, and altitude positions within three dimensional polygons on or above the Earth's surface. Geofencing computation engine 206 receives aircraft position data from data fusion and post processor 202 for live geofence calculations and receives geofence applications from database servers 204. Geofencing computation engine 206 supplies geofence computation results to database servers 204 for archival needs. The deicing system leverages geofencing for taxi-way, deicing ramp areas, and bay areas, as described in greater detail herein. Geofence statistics are automatically computed on the predefined queue areas, which can be presented to the user in a smart table in both real-time and historic replay.

One or more application servers 208 support the delivery, use, and user authentication of hosted applications to the end users at geographically diverse locations throughout the airport facility via a local or wide area network connection 230 (e.g., the Internet).

Data center 200 further includes an Enterprise Service Bus (ESB) 210 that facilitates communication between mutually interacting software applications in the client-server, service-oriented architecture and supports the dissemination, collection, and data aggregation and correction activities for the client applications. ESB 210 exchanges data with database servers 204, receives live and delayed data feeds from data fusion and post processor 202, and receives live geofence results from geofence computation engine 206. ESB 210 sends to the client devices all deicing operations data, including all real, historic, and adaptation data required by the client application, including but not limited to flight track information, flight plan information, deicing state data, METAR data, deicing fluid data, and personnel data to the client devices. ESB 210 sends data only to an instance of the client (i.e., a particular client device) that the authenticated user is authorized to see. The system interfaces with the existing monitoring systems and sends a notification when deicing data stops flowing from any of the inputs to ESB 210 and when any of the servers (including the fluid monitoring server) in the system becomes unresponsive or unreachable or loses its network connection. ESB 210 sends data only to an instance of the client after the user of the client device has successful authenticated himself Further, ESB 210 is capable of logging the input data, for all source data, to a file. The log file includes system time stamps of when the data was received. A system administrator has the capability to enable and disable logging of the input data from any of the sources individually without resulting in lost or missed data by actively connected client applications. ESB 210 also has the capability to log output data, for all source data, to a file, including system time stamps of when the data was sent. The log files are stored in a location that is accessible by a support team, e.g., in database server 204.

Referring once again to FIG. 2, data center 200 further includes a user-entered data adaptor 214 that supports secure communications between client devices and data center 200 such that users can add, edit, and delete information from the system.

Data center 200 also includes a fluid data adaptor 212 (e.g., a server) that communicates via network 230 with a fluid data module 240 located at the deicing facility to collect deicing fluid data for real time correlation with other data, real time display within the client application, and storage of historic information. Fluid data adaptor 212 collects fluid data and logs it to a database in real-time. Data center 200 has the capability to send current fluid flow data back to the client applications for display by authorized users.

Fluid data module 240 provides a high availability mechanism to collect and send deicing fluid data to fluid data adaptor 212. More specifically, fluid data module includes a fluid collection application (e.g., software) that creates fluid data log files on a server at the deicing facility. The system has the capability to manually load the fluid data log files, created by the fluid collection application at the deicing facility, into the main application database of data center 200 in the event of a network failure between the client and data center 200. The fluid collection application monitors its ability to successfully transmit fluid data to fluid data adaptor 212, in the event of a failure, attempts to reestablish a connection until successful. The fluid collection application sends a heartbeat messages to fluid data adaptor 212 at regular intervals to maintain the connection during periods when no fluid data is being collected. A historic data feed sends the fluid levels at the start and end of deicing events. The historic data feed sends the deicing state transition times saved in the database for use in replay. The historic data feed includes the deicing fields that were last saved in the database (i.e., it does not need to include changes or updates made).

Data center 200 interacts with a plurality of client devices positioned at a variety of locations throughout the airport facility. As shown in FIG. 2, these client devices include deicing facility client devices 250 running client applications and located at the deicing facility. Other client devices 260 running client applications are positioned at other geographically dispersed locations (e.g., aircraft, ramps, FAA towers, etc.) to help promote improved situational awareness and data sharing. Typically, the users of such client devices 260 would include the airport operator, the airlines, and air traffic control personnel (e.g., the FAA within the U.S.). Running client applications, client devices 250 and 260 enable collect and forwarding of information related to deicing operations and provide real-time status information concerning deicing operations to end users, including the ability to track and visually present information about various aspects of deicing operations. Data input on one client device is visible by all authorized users on other client devices that are part of a common user account group.

Figure 3:
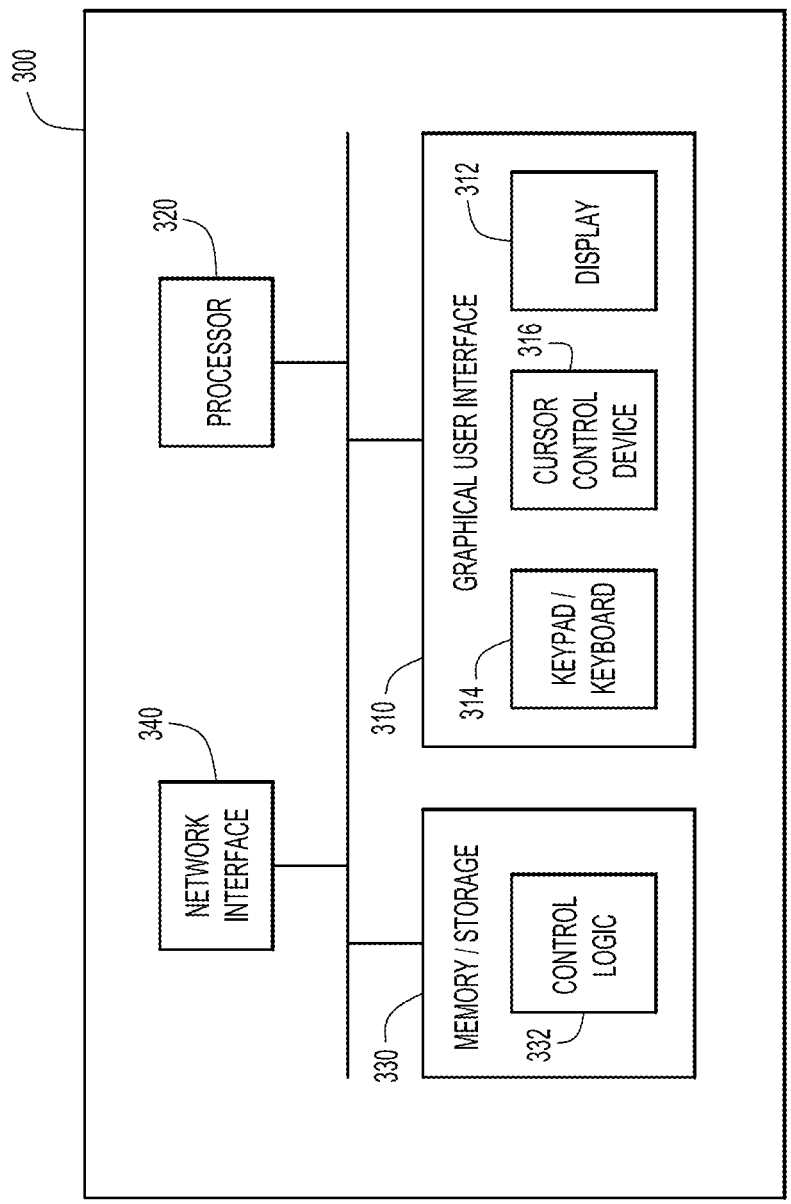
FIG. 3 is a block diagram of an example client device of the commercial aviation deicing system.

FIG. 3 is a block diagram illustrating the components of a representative client device 300 (e.g., one of the deicing facility client devices 250 or other client devices 260). In general, each client device 300 can be embodied as a client application providing a display interface on a stationary console or mobile device such as a tablet or smartphone. As shown in FIG. 3, client device 300 includes a graphical user interface (GUI) 310 that allows a user, such as a deicing technician, air traffic controller, pilot, or system manager or administrator, to interact with the deicing system and data center 200 (e.g., to enter commands, configure equipment, select display parameters, and monitor conditions and performance). GUI 310 can include, for example, a display device 312 and user input devices such as a keypad/keyboard 314 and a cursor control device 316. Display device 312 can be any of a wide variety of known devices, such as an LCD or OLED display whose optical state is transformed by controlling the color of light emitted by individual pixels based on signals from a processor.

Keypad/keyboard 314 allows the user to enter alphanumeric characters, which are displayed on display device 312. Keypad/keyboard 314 can be configured as a physical device and/or as a keyboard or keypad depicted on display device 312. In the latter case, characters can be selected by moving a cursor, or by touching the screen in the case of a touch-screen display. Cursor control device 316 can be any of a variety of mechanisms that allow the user to move a cursor depicted on the display to a desired location to alter the display or to make a selection. For example, cursor control device 316 can be a mouse, a touch pad, one or more keys, a roller ball, or a touch screen (i.e., the display device itself). The GUI 310 essentially allows the user to selectively control the format and content of the display device 312 based on input from the keypad/keyboard 314 and/or cursor control device 316. It will be appreciated that GUI 310 may include other types of user-input devices such a microphone, joystick, etc.

The user input devices of GUI 310 allow the user to enter data relating to deicing operations and display control settings. As described in greater detail herein, the user-entered data relating to deicing operations are supplied to servers of data center 200, while the display control settings allow the user to select what information from deicing operations data received from data center 200 is to be displayed on display 312 via a visual data presentation. The visual data presentation can include, for example, one or more maps, dashboards, smart tables, and data-entry windows.

Client device 300 further includes a processing capability represented in FIG. 3 by processor module 320. Processor 320 can include, for example, one or more microprocessors, microcontrollers, or digital signal processors capable of executing program instructions (i.e., software) for carrying out various operations and tasks of the deicing system described herein. For example, processor 320 can interpret data and commands received from the user input devices of GUI 310, perform computations, cause information to be stored, and control the display 312 of GUI 310.

Client device 300 further includes one or more memory or storage devices represented by storage/memory module 330 to store a variety of data and software instructions (control logic 332) for execution by processor 320. Memory/storage module 330 may comprise read only memory (ROM), random access memory (RAM), magnetic disk storage media devices, optical storage media devices, solid-state memory devices, flash memory devices, electrical, optical, or other physical/tangible (e.g., non-transitory) memory storage devices. Thus, in general, memory/storage module 330 comprises one or more tangible (non-transitory) processor-readable or computer-readable storage media that stores or is encoded with instructions (e.g., control logic/software) that, when executed by processor 320, cause processor 320 to perform the operations described herein. Memory/storage module 330 may also store various other data and information necessary for operation of client device 300, such as data filtering/screening information and display attributes.

The interconnections between the components of user client device 300 are represented generally in FIG. 3 with a bus structure. A network interface 340 coupled to the bus provides a connection between the components of client device 300 and other devices in the network environment (e.g., via network 230) and allows client device 300 to send and receive information and commands to and from other devices, such application server 208, database server 204 (via enterprise service bus 210), and user entered data adaptor 214 of data center 200. In general, network interface 340, GUI 310, processor 320, and storage/memory module 330 can be interconnected in any suitable manner. The configuration and components of the client device 300 can take many forms and are described herein only in general terms for context. Those skilled in the art will appreciate that the techniques described herein for generating and presenting data relating to deicing operations are applicable regardless of the particular architecture of the client devices.

While FIG. 3 shows a processing environment comprising a data processor that executes software stored in a memory, an alternative processing environment is a fixed data processing element, such as an application specific integrated circuit (ASIC) that is configured, through fixed hardware logic, to perform certain functions. Yet another possible data processing environment is one involving one or more field programmable logic devices (e.g., FPGAs), or a combination of fixed processing elements and programmable logic devices.

Client device 300 comprises a client application capable of generating visual data presentations (i.e., "views" or "displays") of deicing process information. The visual data presentations can be controlled to depict information about selected deicing operations within the airport. Deicing related information can be categorized and filtered according to combinations of the selected display attributes, and the user can observe the deicing related information of the whole enterprise or just a selected part of it containing only certain information (e.g., a specific location, flight, airline, etc.) as described in greater detail below.

Figure 4:
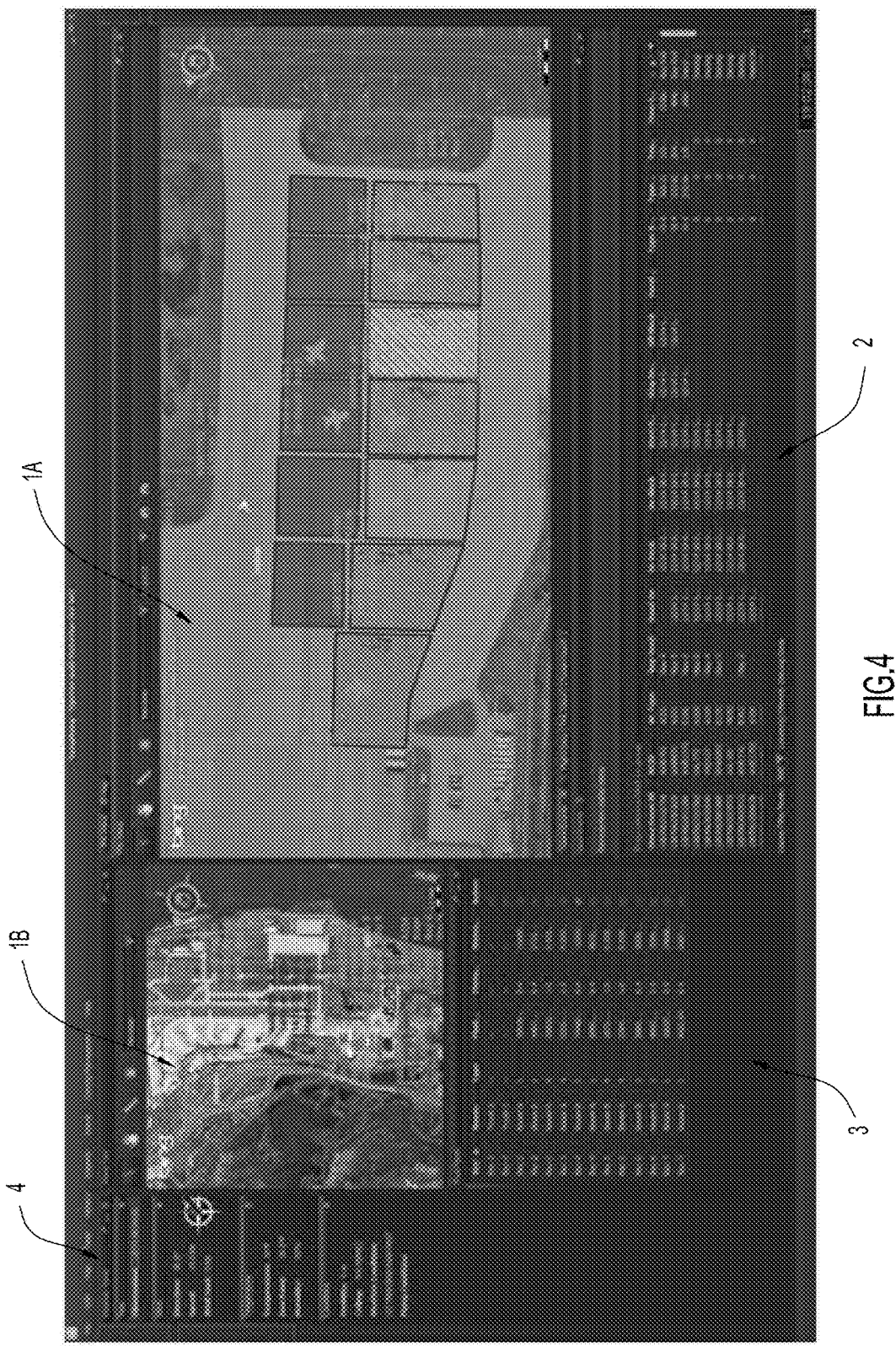
FIG. 4 is a screenshot of a user interface display of a client device depicting an example of visual presentations displayed to a user during deicing operations.

The client application controls a set of visual data presentations displayed on the GUI display 312 of the client device through which users can enter and view information. The application allows the user to configure the visual data presentations' positions within the display workspace as needed and controls which visual data presentations are displayed at given time. FIG. 4 is a representative screenshot of a client device display configured to simultaneously display a set of visual data presentations as a group of windows arranged side-by-side in the display area. According to another option, the display windows can be overlapped. Window areas 1a and 1b of the display depict maps, which are the primary visual data presentation through which users can see specific locations of aircraft in real-time. The client application can display, simultaneously and/or sequentially, multiple two-dimensional and three-dimensional maps to meet the needs of a particular user. FIG. 4 depicts two maps. Map 1a is focused on a central deicing facility and shows aircraft and bay state details. Map 1b is focused on the aircraft taxiing queue, and corresponding geofence, leading to the central deicing facility. Each map can be independently configured in the following ways:

Map layers can be added or removed as needed to display required geospatial data.

Rules can be created to control the color, icon, and data tags for aircraft targets (collectively referred to as "attributes"). Rules are typically established to change the aircraft icon's display to indicate the change in state in the deicing workflow, geofence entry/exit, timers, or other information about the aircraft. At any site, appearance rules are established to provide at-a-glance insight on an aircraft's current disposition.

Deicing bay geofence state colors to represent the current occupancy, activity, and deicing workflow status.

Map zoom level, scale, extents, projection, and orientation.

Thus, the displayed map can depict a visual representation of the aircraft participating in a deicing process (i.e., from the initial queue through the completion of the process), wherein the visual representation of the aircraft includes attributes identifying the aircraft and indicates a stage of the deicing process the aircraft is undergoing. The map can also depict a visual representation of the deicing facility with a plurality of deicing bays for deicing aircraft, where the visual representation of the deicing facility presents each of the deicing bays as a distinct geofenced area with display attributes indicating an operating status of each of the deicing bays.

Referring again to FIG. 4, display window area 2 depicts a visual presentation in the form of a dashboard showing deicing event activity. More specifically, the activity dashboard comprises a deicing event "smart table" showing the status of all aircraft that are or have been active in the last twelve hours. The smart table is configurable to show a user configurable set of fields including, for example: aircraft type, owner, registration number, flight number, deicing workflow state, bay assignment and bay used, deicing fluid application, critical geofencing states, and timers that track throughput and time elapsed since deicing.

Figure 6:
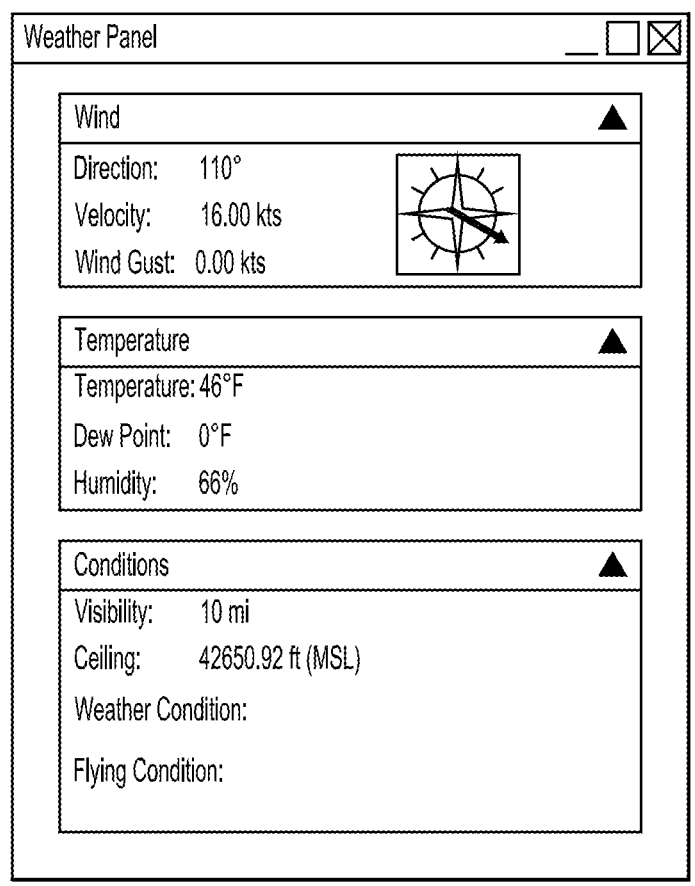
FIG. 6 is a mockup of a weather display panel that can be displayed on a graphical user interface of a client device.

Display window area 3 in FIG. 4 depicts a visual presentation in the form of a dashboard showing fluid spray activity. This dashboard comprises a fluid panel showing the instantaneously updated state of the fluid being sprayed, including relevant fluid totals and simple system status. The fluid display also has a function to display a near real time icon to denote that a spray event has begun but not yet completed for the given boom. The rows of the table can be grayed out in the event of a boom/bay being disabled or closed. This display can disabled during historic replay. FIG. 5 shows a mockup of an example deicing fluid display panel. By way of a non-limiting example, the client application allows the user to toggle on and off a display of the current fluid levels and flow for each of the booms being monitored. The current fluid levels can show the following values for each boom:

Type 1 Amount
Type 4 Amount
Type 1 Percentage
Type 1 Water
Type 1 Start Time
Type 1 End Time
Type 4 Start Time
Type 4 End Time Display window area 4 in FIG. 4 depicts a visual presentation of a weather panel showing the current weather conditions. A weather display displays near real-time weather data from the METAR web service. FIG. 6 shows a mockup of an example weather display panel. By way of a non-limiting example, the map display allows the user to toggle on and off a weather display that has the following information:

Update date and time
Temperature [xxxx] [F|C]
Dew Point [xxx] [F|C]
Ceiling: [xxxxxx] ft
Visibility: [xxxx] Miles
Wind: From [direction] at [speed] knots
Weather Conditions: [ex: SNOW, RAIN, etc.]
Sky conditions: [ex: FEW020 OVC120]
Pressure: [xxxx] in Hg
Humidity: [xx]%

The display control settings include temporal display parameters. More specifically, a "live" mode can be selected in which data is displayed essentially in real time or near real time, since data is streamed directly to client devices 300 from the servers and processors of data center 200. A "historic" mode can also be selected in which data from a previous time period is displayed. In this case, the user can select a past time period of interest by, for example, making a time-span selection, which can be specified by entering a start time/date and an end time/date, a start time/date and a duration, or some other equivalent time period delimiters. The client application supports replaying deicing data, specifically state change times, deicing requests, and deicing bay assignments, alongside historic surveillance data at variable replay speeds.

By way of a non-limiting example, the client application can display progress information for any operation that takes more than five seconds to complete. The system includes additional flight data fields in the flight object for display in smart tables, data tags, for use in filters, and appearance controls:

Request for deicing
Bay Assigned
Bay Used
Deicing state
Deicing instructions
Deicing timer The system has the capability to start a timer when the deicing is complete and to stop the deicing timer when the flight takes off or returns to the gate.

At least one of the maps rendered by the client application on the display of the client device depicts deicing bays as geofenced objects on the map. Specifically, the client application provides a visible differentiation in the map display between different deicing bay states, the enumeration of which includes, for example: out of service, empty, queued, on block, deicing, deice complete, off-block. These different states can be visually indicated by attributes such as color shading of the bay region within the map view and/or by various types of cross-hatching. During the deicing process (from on block to off block), the flight associated with the aircraft being deiced can be snapped to the deicing bay.

Figure 7:
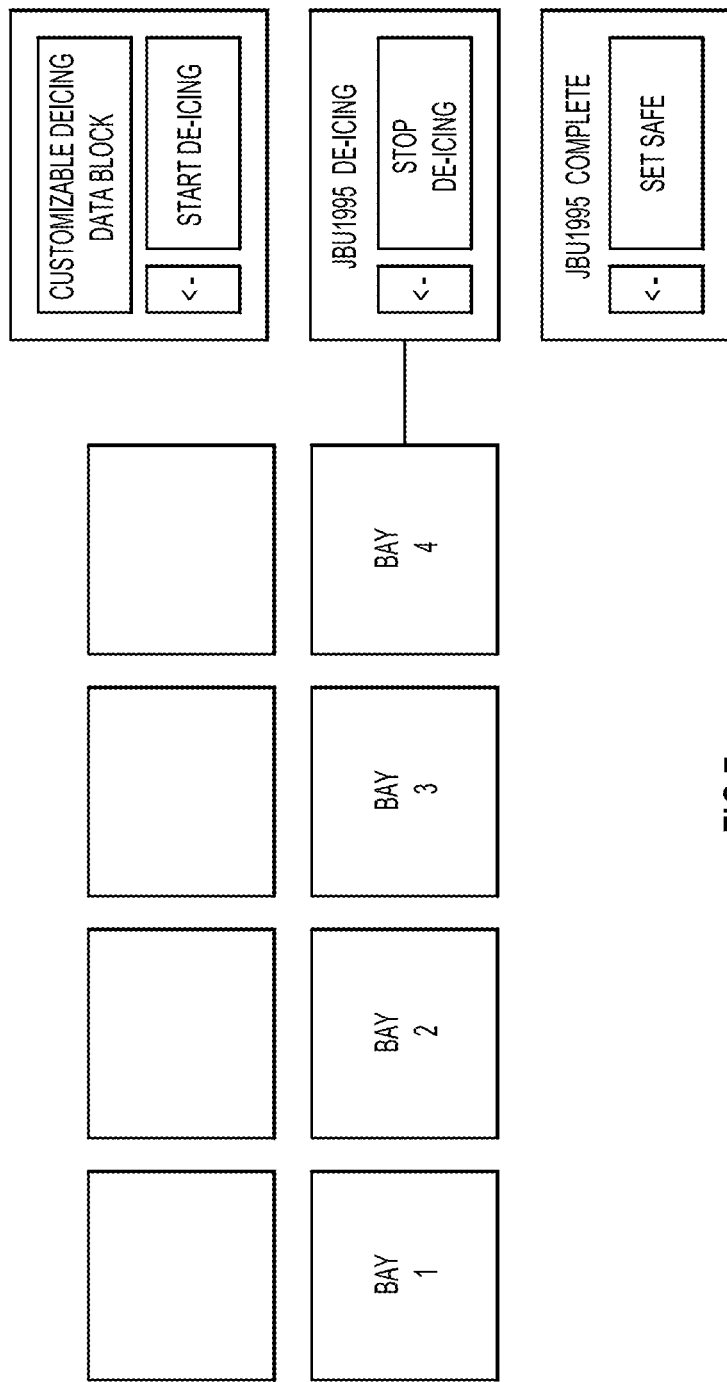
FIG. 7 is a mockup of a deicing bay control window that can be displayed on a graphical user interface of a client device.

As part of deicing bay control, the client application displays on the GUI of the client device a non-ordered list of all flights en route to a specific deicing bay in a smart table display. Specifically, a user customizable set of fields is displayed on the deicing bay object, retrieved from flight data regarding the current or "next" aircraft being deiced. The client application provides an indication, through interaction with the deicing bay object on the map, to manually progress or regress the deicing state of any deicing operation. Through the deicing bay control, the client application generates a deicing event separate from surveillance. If the deicing operation times are not populated, the event is generated in the "on-block" state and allowed to progress through the standard procedure, manually setting an off-block time, at which point it is then considered a "historic"

deicing event. A smart table is displayed containing the history of deicing events that passed through a given bay during the active session. FIG. 7 shows a mockup of a deicing bay control display that can be presented in a window of the GUI display 312.

Figure 8:
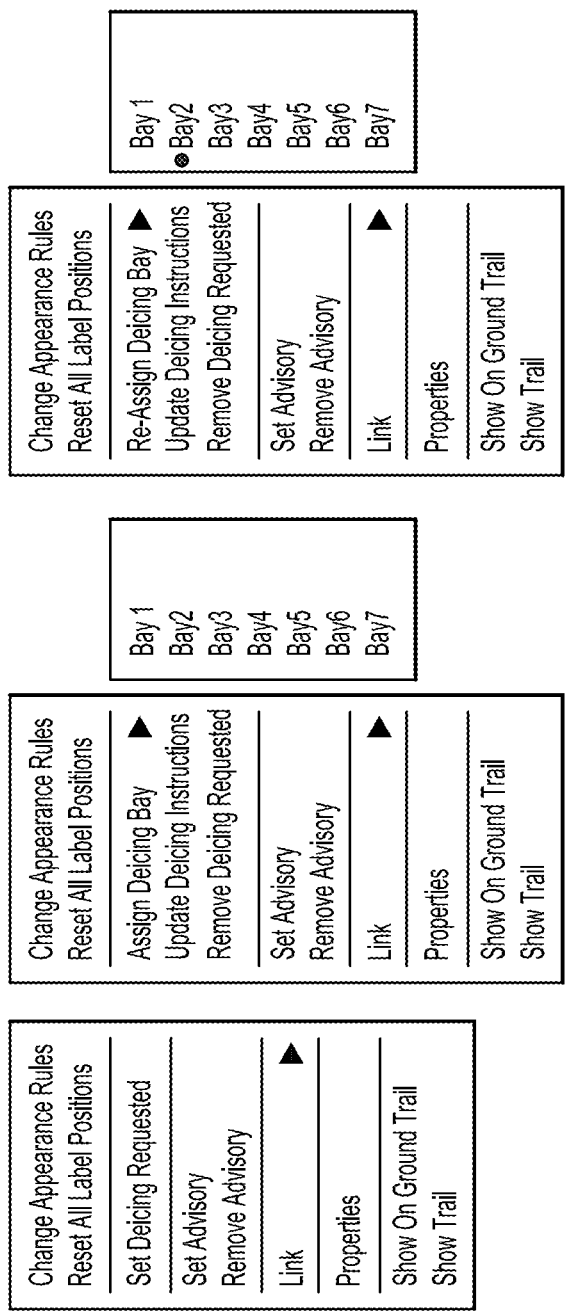
FIG. 8 is a mockup of a flight deicing assignment window that can be displayed on a graphical user interface of a client device.

Advantageously, the client application allows the displayed map to be used in flight deicing assignment. Specifically, a user can tag a flight as deicing requested through the map display by selecting the flight object. After it has been marked as deicing requested, the flight can be assigned to any of the deicing bays that are in service. Deicing bays that are out of service have their option unavailable. Users with sufficient authorization are permitted to re-assign an operation to a different deicing bay after having been previously assigned. The client application has the capability to inform the user when an aircraft is assigned to a bay that is not compatible with that aircraft type (e.g., the bay is too small). The GUI of the client device allows users with sufficient authorization to enter a text string for an operation, which may contain specific instructions. FIG. 8 shows a mockup of a flight deicing assignment screen sequence.

The GUI 310 of client device 300 allows the user to enter a variety of data relating to deicing operations. Specifically, the client application can display a dialog screen for data entry to enter/update fields in the deicing record, including: airline, aircraft type, tail number, deicing fluid mixture type, Type 1 fluid percentage, Type 1 amount, Type 4 amount, Type 1 fluid LOUT, Type 4 fluid LOUT, bay number, in queue time, on deck time, on block time, start deicing time, stop deicing time, safe time, off block time, secondary conditions, and general comments. FIG. 9 is a mockup of a deicing data entry screen that can be displayed on the display 312 of the client device for entry of this information. This deicing event information can also be displayed in a smart table in a live or historic mode.

Figure 10:
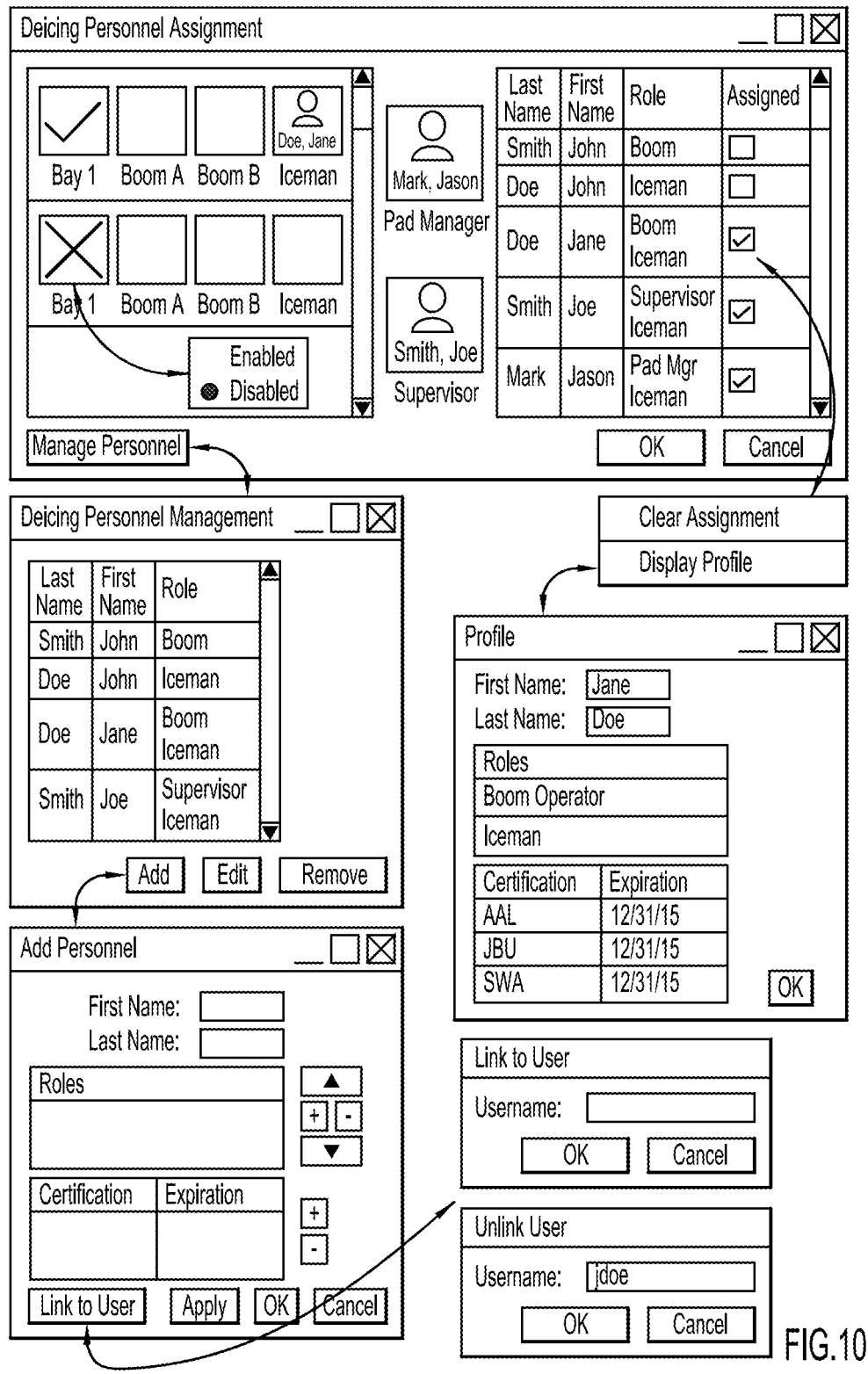
FIG. 10 is a mockup of a deicing personnel assignment/management window that can be displayed on a graphical user interface of a client device.

The client application also controls the display of the client device to present screens that support deicing personnel management. For example, via input screens, the client application allows users with sufficient authorization to assign a boom operator to an active deicing boom and notifies the user if a boom operator is not certified to service the airline of an operation that is scheduled to come into the bay to which the operator is assigned. Similarly, the client application allows users with sufficient authorization to assign an ice man and a pad controller to any number of bays. Further, the client application allows users with sufficient authorization to mark any deicing bay as active or inactive, provides the capability to log who the active supervisors are and their bay assignments, provides the capability to enter staff into the system, provides the capability to assign staff roles of boom operator, iceman, pad controllers, supervisor, or administrator, and provides the capability to associate certifications of airlines and to boom operators. FIG. 10 shows a mockup of a series of example user input screens displayed on the client device that allow a user to perform personnel management.

Figure 11:
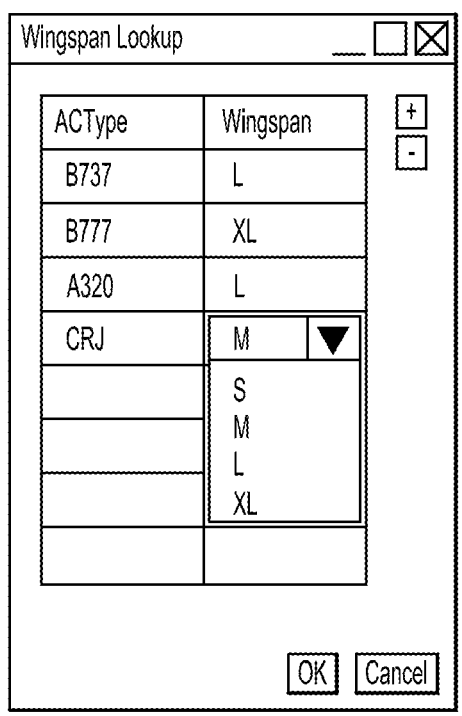
FIG. 11 is a mockup of a wingspan management table that can be displayed on a graphical user interface of a client device.

The client application is capable of controlling the GUI of the client device to display a smart table for authorized users to display and edit a wingspan lookup table. FIG. 11 shows a mockup of an example wingspan management table that can be displayed on the client device.

The client application is further capable of controlling the GUI of the client device to display a simple mapping of LOUT values for mixtures and percentages. Inline editing is supported to simplify management and remove the need for an "edit" control. FIG. 12 shows a mockup of an example LOUT management table that can be displayed on the client device.

To illustrate examples of certain operations of the client devices in the context of the deicing process summarized in FIG. 1, when the aircraft pilot contacts the ramp tower to request deicing upon pushback, the tower operator's client device receives a deicing request by the tower operator clicking a corresponding aircraft icon on the displayed map. The client application responds by automatically populating the aircraft information. The aircraft's status, identification, and progression to the deicing facility are seen by all users via the activity dashboard and via an icon on the map(s) and attributes of the icon (e.g., the color of the aircraft icon can indicate its status in the stages of the deicing process, and data fields can be depicted adjacent to the icon on the map to display at least some of the aforementioned information associated with the aircraft (e.g., flight number, airline, tail number, aircraft type, bay assignment, etc.).

As the aircraft approaches or reaches the first spot in the deicing queue, the pilot is informed of the deicing bay assignment (hand off to deicing), and the aircraft is placed into the deicing bay queue (on deck, on block). The deicing process is monitored and the status is visible to all users (start deice, stop deice, safe time, off block, etc.). Concurrently, fluid data is available in real time via the fluid spray activity dashboard to authorized users only. Fluid totals and milestone times are collected and displayed in real time. The system has the capability to trigger the start and end of fluid flow from each boom separately. Fluid totals, deicing crew, weather, and aircraft information are automatically saved for reporting and billing purposes. Upon completion of the deicing process, the aircraft departs the deicing facility and is handed off to the FAA controller (bay exit, hand off, and departure). Holdover and taxi times are computed and displayed throughout the process, and questions can be addressed through replay of aircraft movement, deicing state, and applied fluid in replay.

The deicing system also supports the creation of various reports including: reports for each deicing event showing all records that start within a user entered date and time range; geofencing reports showing queue and pavement throughput; and custom reports from a user selectable set of deicing flow records and fields. The custom reports can join operation records, geofence records, flow records, staff management data, staff assignments, and certifications, and weather data.

The deicing system can be configured to allow access to view and edit information based on the role of the user. By way of a non-limiting example, a properly authenticated and authorized "iceman" user can view in a live or historic mode deicing data associated with flight object data in the following ways:

All Ramp Operations use cases.
View Deicing Bay assignments in smart tables.
View deicing bay assignment and request status smart tables (including fluid totals).
Manually change state of deicing operation with attached times by selecting deicing area geofences.
Attach comments to deicing event.
Set a deicing operation complete.
Edit any field associated with a deicing event for an active flight.
Open/Close deicing bays A properly authenticated and authorized pad controller can have the same access as an iceman with the additional authority to set/reset a flight's deicing bay assignment.

A properly authenticated and authorized supervisor can have the same access as a pad controller with the additional authority to:
  Assign Supervisors, Pad Control, Iceman, and Boom Operators to deicing bays.
  Oversee all deicing bay operations, override Pad Control input if necessary.
  Modify any field in the deicing data entry for any active or historic deicing event.
  All tasks for system setup and maintenance.
  Monitor deicing fluid flows.
  Run reports, including the deicing event report.

A user properly authenticated and authorized to perform system setup and maintenance supervisor can have the authority to:
  Create geofences.
  Mark selected geofences as deicing pads.
  Mark selected geofences as deicing queue.
  Delete selected deicing pads.
  Enter/Edit deicing pad information.
  Create/Edit/Delete Boom/Iceman/Pad Control/Supervisors.
  Associate credentials/certifications with boom operators.
  User account creation.
  Aircraft type wing spans.

A properly authenticated and authorized observer can have the authority to do the following:
  View deicing bay assignment and request status on the flight's data tag on the map.
  Use the data tags to with the appearance rules to change the maps display.
  View deicing bay status.
  View deicing bay use smart table.
  View deicing event details (without fluid totals).
  Monitor current weather.

A properly authenticated and authorized ramp operator can have the same access as an observer with the additional authority to select a flight and tag the flight as "deicing requested and to select a flight and remove the "deicing requested" tag.

While the disclosed system has been described in the context of monitoring and controlling deicing operations, it will be appreciated that other aspects of aircraft-related ground operations at an airport facility can be monitored and controlled in the same manner including, but not limited to, refueling of aircraft, scheduling of baggage handling (e.g., loading and unloading from aircraft), pre-flight stocking of aircraft supplies, post-flight removal of garbage and waste from aircraft, and aircraft maintenance.

Having described example embodiments of a commercial aviation deicing system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for monitoring and controlling operations for deicing aircraft at an airport facility, comprising:
  a user interface configured to receive user-entered data relating to deicing operations and display control settings;
  a network interface configured to supply the user-entered data to at least one server via a network and to receive deicing operations data from the at least one server via the network;
  a processor configured to:
    process the deicing operations data, including state changes for deicing processes of aircraft, and entry and exit of the aircraft with regard to distinct geofenced areas, received from the at least one data server in accordance with the display control settings; and
  a display device configured to display a visual data presentation of at least some of the deicing operations data, the visual data presentation including at least one map depicting:
    a visual representation of at least one aircraft participating in a deicing process, wherein the visual representation of the aircraft includes display attributes identifying the aircraft and indicating a stage of the deicing process the aircraft is undergoing; and
    a visual representation of a deicing facility with a plurality of deicing bays for deicing aircraft and a taxi-way leading to the deicing facility, wherein the visual representation of the deicing facility presents each of the deicing bays as a distinct geofenced area with display attributes indicating an operating status of each of the deicing bays, wherein the visual representation presents the taxi-way as another distinct geofenced area including aircraft in a taxiing queue, and wherein the visual representation is configured to show the state changes for the deicing processes and entry and exit of the aircraft with respect to the distinct geofenced areas.

2. The apparatus of claim 1, wherein the display device is further configured to display, simultaneously with the at least one map, at least one table depicting tabular data relating to deicing events for a plurality of aircraft.

3. The apparatus of claim 1, wherein the display device is configurable in a live mode in which data is displayed in real time or near real time, and in a historical mode in which archival data is displayed.

4. The apparatus of claim 1, wherein the display attributes of the aircraft and deicing bays comprise different colors to represent different stages and operating status, respectively.

5. The apparatus of claim 1, wherein the display device is further configured to display at least one table depicting deicing fluid levels in the deicing facility.

6. The apparatus of claim 1, wherein a change in state for a deicing process is shown in the visual representation as a color change of the distinct geofenced area.

7. A method of monitoring and controlling operations for deicing aircraft at an airport facility, comprising:
  receiving via a user interface of a client device user-entered data relating to deicing operations, including state changes for deicing processes of aircraft, and entry and exit of the aircraft with regard to distinct geofenced areas, and display control settings;
  supplying, via a network interface of the client device, the user-entered data to at least one server over a network;
  receiving, via the network interface, deicing operations data from the at least one server over the network;
  processing, via a processor of the client device, the deicing operations data received from the at least one data server in accordance with the display control settings and state changes; and
  controlling a display device of the client device to display a visual data presentation of at least some of the deicing operations data, the visual data presentation including at least one map depicting:
   a visual representation of at least one aircraft participating in a deicing process, wherein the visual representation of the aircraft includes display attributes identifying the aircraft and indicating a stage of the deicing process the aircraft is undergoing; and
   a visual representation of a deicing facility with a plurality of deicing bays for deicing aircraft and a taxi-way leading to the deicing facility, wherein the visual representation of the deicing facility presents each of the deicing bays as a distinct geofenced area with display attributes indicating an operating status of each of the deicing bays, wherein the visual representation presents the taxi-way as another distinct geofenced area including display of aircraft in a taxiing queue, and wherein the visual representation is configured to show the state changes for the deicing processes and entry and exit of the aircraft with respect to the distinct geofenced areas.

8. The method of claim 7, further comprising controlling the display device to display, simultaneously with the at least one map, at least one table depicting tabular data relating to deicing events for a plurality of aircraft.

9. The method of claim 7, further comprising configuring the display device in one of: a live mode in which data is displayed in real time or near real time; and a historical mode in which archival data is displayed.

10. The method of claim 7, wherein the display attributes of the aircraft and deicing bays comprise different colors to represent different stages and operating status, respectively.

11. The method of claim 7, further comprising controlling the display device to display at least one table depicting deicing fluid levels in the deicing facility.

12. The method of claim 7, wherein a change in state for a deicing process is shown in the visual representation as a color change of the distinct geofenced area.

13. One or more non-transitory computer readable storage media having instructions encoded thereon that, when executed by a processor, cause the processor to:
   receive user-entered display control settings for controlling a display device of a client device for monitoring and controlling operations for deicing aircraft at an airport facility;
   receive deicing operations data, including state changes for deicing processes of aircraft, and entry and exit of the aircraft with regard to distinct geofenced areas;
   process the deicing operations data in accordance with the display control settings; and
   control the display device of the client device in accordance with the display control setting to display a visual data presentation of at least some of the deicing operations data, the visual data presentation including at least one map depicting:
      a visual representation of at least one aircraft participating in a deicing process, wherein the visual representation of the aircraft includes attributes identifying the aircraft and indicating a stage of the deicing process the aircraft is undergoing; and
      a visual representation of a deicing facility with a plurality of deicing bays for deicing aircraft and a taxi-way leading to the de-icing facility, wherein the visual representation of the deicing facility presents each of the deicing bays as a distinct geofenced area with display attributes indicating an operating status of each of the deicing bays, wherein the visual representation presents the taxi-way as another distinct geofenced area including aircraft in a taxiing queue, and wherein the visual representation is configured to show the state changes for deicing processes and entry and exit of the aircraft with respect to the distinct geofenced areas.

14. The non-transitory computer readable storage media of claim 13, having further instructions encoded thereon that, when executed by the processor, cause the processor to display, simultaneously with the at least one map, at least one table depicting tabular data relating to deicing events for a plurality of aircraft.

15. The non-transitory computer readable storage media of claim 13, having further instructions encoded thereon that, when executed by the processor, cause the processor to display data in one of: a live mode in which data is displayed in real time or near real time; and a historical mode in which archival data is displayed.

16. The non-transitory computer readable storage media of claim 13, wherein the display attributes of the aircraft and deicing bays comprise different colors to represent different stages and operating status, respectively.

17. The non-transitory computer readable storage media of claim 13, having further instructions encoded thereon that, when executed by the processor, cause the processor to display at least one table depicting deicing fluid levels in the deicing facility.

\* \* \* \* \*